Jan. 25, 1955     E. L. DECKER     2,700,302
TORQUE INDICATING APPARATUS
Filed Sept. 21, 1950
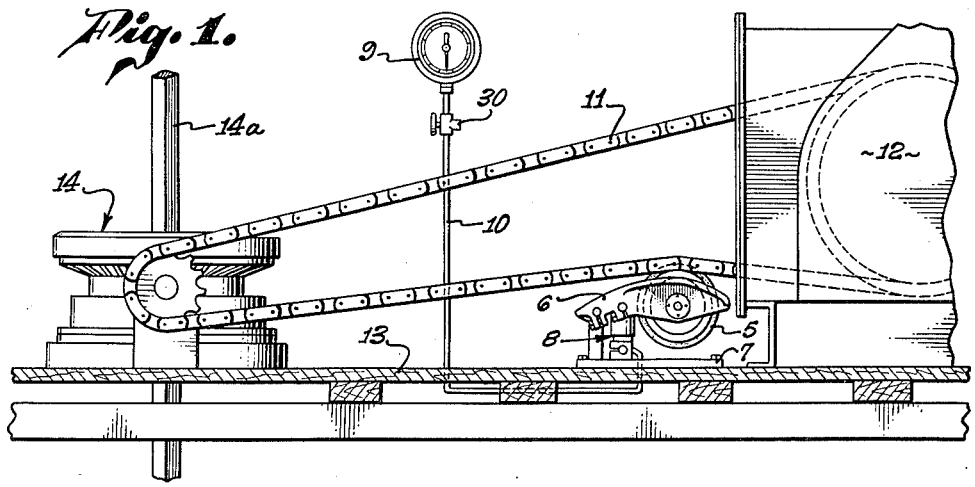
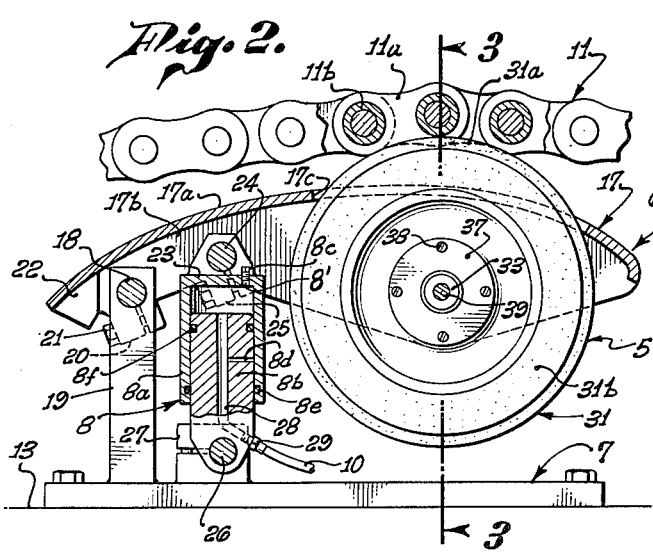
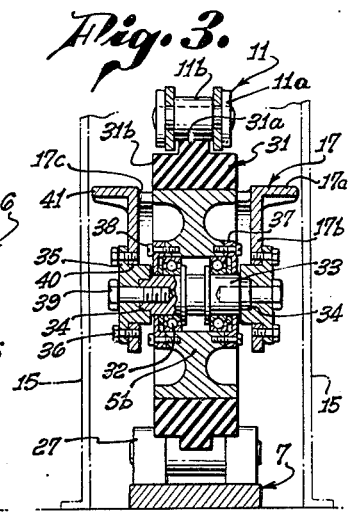
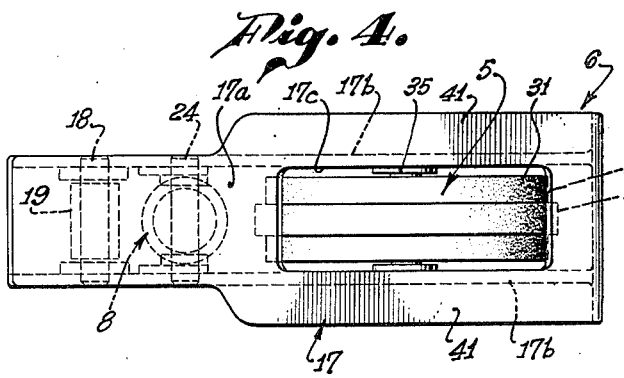
ELMER L. DECKER,
INVENTOR.
BY
Paul A. Weilein
ATTORNEY.

United States Patent Office 2,700,302
Patented Jan. 25, 1955

2,700,302

TORQUE INDICATING APPARATUS

Elmer L. Decker, Long Beach, Calif., assignor to Martin-Decker Corporation, Long Beach, Calif., a corporation of Delaware Application September 21, 1950, Serial No. 185,961

7 Claims. (Cl. 73—136)

This invention relates to means for indicating the torque developed in the operation of chain driven apparatus, particularly well drilling apparatus of the rotary type.

The patent to W. W. Thompson et al., No. 1,795,623, issued March 10, 1931, for Torque Indicating Apparatus, exemplifies apparatus of the general type to which this invention relates. The apparatus of this patent provides an idler wheel adapted to contact the draw works drive chain for the rotary table operating the drill string of a well drilling rig. A lever supports the wheel and moves responsive to variations in the tension of the chain, being held in position to maintain the wheel against the chain by means of a hydraulic device. This hydraulic device operates a torque indicating means when the lever is rocked, thus determining the torque in the drill string, whereby the operation of the drill string may be controlled to avoid failure or damage of the drilling apparatus and to operate it in a most efficient manner.

It is an object of this invention to provide apparatus of this type which is an improvement in many respects over torque indicating apparatus heretofore employed, particularly in point of reliability of performance, longer life, ruggedness, durability, low cost of operation and maintenance, ease of installation and accuracy of operation.

It is another object of this invention to provide torque indicating apparatus wherein a hydraulic sensing unit which responds to loads on the idler wheel for operating the indicator, is also operable as an effective hydraulic jack for the proper positioning of the wheel in installing the apparatus or for adjusting it, to effect the desired deflection of the chain and consequent load on the wheel for the particular installation or where operating conditions require a higher reading of the indicator as may be effected upon elevating the wheel.

It is another object of this invention to provide torque indicating apparatus of the character described which includes an efficient means for maintaining the chain in proper operative relation to the apparatus for an accurate torque indicating response of the latter at all times.

It is another object of this invention to provide apparatus for operating a torque indicator which is constructed and arranged to prevent the chain from effecting such damaging wear of the apparatus as to require replacement thereof or the replacement of major parts thereof.

It is a further object of this invention to provide apparatus such as described having guard means to prevent the driving chain from slipping off the apparatus and damaging critical parts thereof or damaging the usual chain guard which encloses the chain between the rotary table and the draw works of the well drilling rig.

It is another object of this invention to provide in apparatus such as described a novel form of idler wheel having a replaceable chain engaging tread or tire of wear resisting material and which when worn, may be renewed at a much lower cost than required for replacement of the entire wheel unit.

It is an additional object of this invention in apparatus such as described to provide a replaceable tread or tire for the idler wheel which maintains the chain in proper contact with the wheel as well as precludes damaging wear on the wheel proper and parts associated therewith.

This invention possesses many other advantages and has other objects which may be made more easily apparent from a consideration of one embodiment of the invention. For this purpose there is shown one form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is a diagrammatic view showing a typical installation of a torque indicating apparatus embodying the present invention with the apparatus shown in side elevation;

Fig. 2 is an enlarged view partly in section and partly in elevation of the apparatus shown in Fig. 1;

Fig. 3 is a vertical sectional view taken on the line 3—3 of Fig. 2, showing the relation of the apparatus to portions of the chain guard, which latter is omitted in Figs. 1 and 2; and Fig. 4 is a top plan view of the apparatus.

As shown in the drawing, the apparatus of this invention generally comprises an idler wheel 5, a movable supporting means 6 therefor, a base 7 on which the supporting means is mounted, a hydraulic piston and cylinder unit 8 connected with the support means and base, a torque indicator or gauge 9 and a conduit 10 hydraulically connecting the unit 8 with the indicator.

The unit 8, conduit 10 and indicator 9 form a closed hydraulic system such that the unit will maintain the wheel supporting means 6 in position to hold the wheel 5 against the tight run of an endless drive chain 11 of a rotary drilling rig. The wheel supporting means 6 moves responsive to variations in the tension of the tight run of the chain and by such movement operates the piston and cylinder unit 8 which through the conduit 10 hydraulically operates the indicator to indicate the torque developed in the drill string.

As here shown, the drilling rig includes a draw works 12 mounted on the platform 13 and which through the chain 11 drives the rotary table 14. The drill string not shown is operated by means of the usual kelly 14a driven by the table 14. Fig. 3 shows how the apparatus of this invention is installed with relation to side wall portions 15 of the usual chain guard which is omitted in the other views for clarity of illustration.

The wheel supporting means 6 as here provided includes a member in the form of a lever 17 made of a steel casting of channel shape in cross section and having a convexly curved top portion 17a provided along its longitudinal edges with opposed depending flanges 17b. This lever is fulcrumed adjacent one end on a pin 18 rotatably mounted on a post 19 fixed on the base 7, the ends of the pin being secured in clamps 20 integral with the flanges 17b and operable by means of screws 21. A stop lug 22 on the adjacent end of the lever 17 is adapted to abut the post 19 to limit the upward tilting of the free end of the lever.

The wheel 5 is journalled between the flanges 17b adjacent the free end of the lever, there being a slot 17c in the top portion 17a of the lever, through which the wheel 5 extends for contact with the chain 11.

The hydraulic unit 8 is located between the wheel 5 and the fulcrum of the lever 17, with the cylinder element 8a and the piston element 8b thereof connected between the base and the lever. With this arrangement the lever may be raised and lowered properly to set the wheel 5 against the chain 11 responsive to varying the fluid content of the closed hydraulic system. As here shown, the closed end 23 of the cylinder element 8a is pivoted to the flanges 17b of the lever 17 by means of a pin 24 held on the flanges by clamps 25 corresponding to the clamps 20. The piston element 8b is pivotally supported at its lower end by means of a pin 26 secured in clamping ears 27 on the base 7. These ears act as stops to limit downward movement of the cylinder element and therefore limit the downward movement of the free end of the lever 17 to the extent that the wheel 5 is normally spaced above the base 7.

A fluid passage 28 extends from a fitting 29 at the lower end of the piston element 8b, upwardly through said element to communicate with the cylinder space above the piston. The conduit 10 leading from the indicator 9 is coupled to the fitting 29 and is provided with a valved intake fitting 30 by means of which the hydraulic system may be filled with fluid and which makes it possible to pump fluid into the system to elevate the cylinder element 8a and the lever 17 to position the wheel 5 against the chain. Fluid may be removed as desired through fitting 30 to lower the wheel 5. It will now be apparent that relative movement between the piston and cylinder elements responsive to rocking of the lever will develop pressures in the hydraulic system to which the indicator 9 will respond to show torque developed in the operation of the drilling apparatus.

A small port 8' in the top of the cylinder element 8a permits air to escape to the atmosphere in filling the hydraulic system, being closed by a plug 8c after the filling of the system. A relief port 8d in the piston 8b leads from the fluid passage 28 so as to open through the side of the piston between an annular sealing member 8e on the cylinder and a similar sealing member 8f on the piston, to prevent entrapment of fluid between these sealing members.

A replaceable tread or tire 31 is mounted on the wheel 5 for contacting the chain 11 and constitutes that portion of the wheel which projects above the upper side of the top portion 17a of the lever 17. This tread or tire preferably is made of suitable non-metallic wear resisting and readily replaceable material. A tire made of synthetic rubber of about 80 shore, vulcanized or otherwise secured to the wheel has been found suitable but it should be understood that any suitable wear resisting material preferably other than metal and which may be inexpensively replaced by comparison with the cost of replacement of the wheel proper, may be used as within the purview of this invention.

As here shown, the tread or tire 31 is of an inverted T shape in cross section and has a central rib portion 31a projecting outwardly along the longitudinal medial line of the base portion 31b thereof, which latter is substantially equal in width to the rim proper of the wheel 5. In the present instance the rib is about one third the width of the base or body portion 31b but these dimensions and the shape of the tire may be varied according to the size and construction of the particular drive chain specified.

Usually the drive chain 11 comprises links 11a between which are rollers 11b. Thus, the rib 31a of the tire 31 is adapted to extend between the links 11a for contact with the rollers 11b whereas the surfaces of the body 31b on opposite sides of the rib are opposed to the links whereby the roller as an idler is freely rotated with a minimum of friction and wear as the chain is driven. The tire 31 as a whole presents a somewhat yieldable and resilient wear surface of considerable thickness above the top portion 17a of the lever and the rim proper of the wheel 5 and will last for a comparatively long period of time before being worn to the extent that the chain will ride on the top portion 17a.

The wheel 5 is removably mounted on the lever 17, and has a hub 5b in which are mounted anti-friction bearing units 32 for an axle 33. This axle has reduced ends 34 which are socketed in caps 35 removably mounted on the opposed flanges 17b by means of screws 36. The bearing units 32 are held in place by means of retaining rings 37 secured by screws 38 to the hub 5b. Screws 39 secure the ends 34 of the axle 33 to the flanges 17b, which latter have openings 40 to accommodate the caps.

When the tire 31 becomes worn to the point that it provides an ineffective surface for contact with the chain 11, the wheel 5 may be removed by removing the screws 36 and 39 and the caps 35, whereby a replacement wheel with a new tire thereon may be installed. The removed wheel is subject to further use after a new tire has been mounted thereon.

An important feature of this invention is the provision of a guard means which prevents the chain 11 from damaging the wheel 5 proper as well as any part of the apparatus other than the tire. This guard means also prevents the chain from slipping down between the chain guard side walls 15 and the sides of the lever or the sides of the wheel, and damaging the chain guard or the apparatus hereof or both.

Should the tire 31 become worn away without being noticed by the operators of the drilling rig, the guard means will prevent damaging wear of critical parts of the apparatus for a considerable length of time. As here provided, this guard means is embodied in the lever 17 and constitutes laterally extended flanges 41 on opposite sides of the lever and parts of the top portion 17a which project laterally in opposite directions from the tread of the wheel 5. The flanges 41 extend from the free end of the lever to a point somewhat beyond the end of the slot 17c nearest the fulcrum of the lever. Thus, the top surface of the lever by reason of these flanges, is widest from the free end of the lever for more than half the length thereof and provides a chain contacting area which surrounds the wheel above the axis of the latter to prevent wear of the wheel proper and its bearings. The flanges 41 will extend close to the side walls 15 of the chain guard as seen in Figure 3, thereby preventing the chain from slipping off the wheel 5 or the lever 17 and dropping between the lever and the chain guard side walls and possibly damaging the chain guard and the wheel. The flanges 17b of the lever also protect the critical parts of the wheel 5 and lend considerable strength to the lever.

It should be noted that the lever 17 may be inclined as necessary properly to set the wheel 5 against the tight run of the chain 11 according to the height and angle of the particular chain which may vary with different draw works and drilling rigs. When the apparatus is properly installed the wheel 5 will deflect or bow the chain upwardly so that the weight of part of the chain is on the wheel whereby the lever will rock with all variations of the tension of the chain, thus, operating the hydraulic unit 8 so that the gauge 9 will indicate the torque developed in the drill string. The tilting of the lever 17 to raise the wheel 5 into proper contact with the chain may be effected by pumping fluid into the hydraulic system through the valved fitting 30.

Regardless of the position or angle of the lever 17, the guard flanges 41 and the upper surfaces of the lever adjacent thereto will prevent the chain from slipping off the wheel tire 31 and, in the event of wearing away of the tire, will prevent the chain from subjecting the wheel proper to wear. The convex upper surface of the lever 17 presents a minimum of lever area which will contact the chain in the event the chain slips off the wheel or in the event the tire wears down to the point that the chain will contact the lever. The rim proper of the wheel 5 in being below the upper surface of the lever 17 adjacent thereto is protected against wear.

The construction and shape of the lever 17 is such that it will withstand considerable wear without becoming unfit for use, and if the apparatus is unattended over long periods of use and the chain effects considerable wear, such wear will take place at non-critical points on the lever and will not impair its usefulness.

It is important to note that the piston and cylinder unit 8 is operable as an effective hydraulic jack for the lever 17 and wheel 5 in order that the wheel may be set in position properly to deflect the chain and place the desired load on the wheel best to suit the particular installation or where operating conditions require that the wheel be elevated to obtain a higher reading of the indicator. Also, where a link of the chain is removed the hydraulic unit may be operated as a jack for effecting the required compensating elevation of the idler wheel.

I claim:

1. In apparatus for operating an indicator for determining the torque of the chain driven drill string of well drilling apparatus, a wheel having a rim, the replaceable tread on said rim, adapted to contact the drive chain for said drill string, means forming a support for said wheel movable responsive to variation of the tension of said chain, means responsive to movement of said support forming means adapted to be connected with said indicator for operation thereof, and guard means having surfaces opposed to said chain for preventing the chain from contacting said rim in the event of wearing away of said tread.

2. In apparatus for operating an indicator for determining the torque of the chain driven drill string of well drilling apparatus, a wheel having a rim, a replaceable tread on said rim, adapted to contact the drive chain for said drill string, means forming a support for said wheel movable responsive to variation of the tension of said chain, means responsive to movement of said support forming means adapted to be connected with said indicator for operation thereof, and guard means on said wheel supporting means having surfaces opposed to said chain for preventing the chain from contacting said rim in the event of wearing away of said tread.

3. In apparatus for operating an indicator for determining the torque of the chain driven drill string of well drilling apparatus, a base, a lever fulcrumed adjacent one end on said base, a wheel mounted for rotation on said lever, a tread on said wheel adapted to contact the tight run of the drive chain for said drill string, a hydraulic cylinder element, a piston element operable in said cylinder element, means connecting one of said elements to said lever at a point between said wheel and said fulcrum, means connecting the other of said elements to said base, and means affording the connection of said elements with said indicator to form a hydraulic system for operating said indicator responsive to relative movement of said elements, and guard portions on said lever extending laterally from opposite sides of said lever between said wheel and the periphery of said tread for preventing said chain from contacting said wheel in the event the chain becomes disengaged from said tread or said tread becomes worn.

4. In apparatus for operating an indicator for determining the torque of the chain driven drill string of well drilling apparatus, a base, a lever fulcrumed adjacent one end of said base, a wheel mounted for rotation on said lever, a tread on said wheel adapted to contact the tight run of the drive chain for said drill string, a hydraulic cylinder element, a piston element operable in said cylinder element, means connecting one of said elements to said lever at a point between said wheel and said fulcrum, means connecting the other of said elements to said base, and means affording the connection of said elements with said indicator to form a hydraulic system for operating said indicator responsive to relative movement of said elements, said lever presenting opposite said chain a surface convexly curved in the direction of the length of said chain and which overlies said piston and cylinder elements and extends along opposite sides of said wheel said convexly curved surface being disposed to prevent the chain from contacting said wheel in the event of wearing away of said tread.

5. In apparatus for operating an indicator for determining the torque of the chain driven drill string of well drilling apparatus, a base, a lever fulcrumed adjacent one end on said base, a wheel mounted between the ends of said lever adapted to contact the tight run of the drive chain for said drill string, a hydraulic cylinder element, a piston element operable in said cylinder element, means connecting one of said elements to said lever at a point between said wheel and said fulcrum, means connecting the other of said elements to said base, means affording the connection of said elements with said indicator to form a hydraulic system for operating said indicator responsive to relative movement of said elements, said lever being enlarged as to width to provide opposed laterally directed flanges between which said wheel is mounted, said flanges being disposed between the portion of the wheel engaged with said chain and the axis of the wheel.

6. In apparatus for operating an indicator for determining the torque of the chain driven drill string of well drilling apparatus, a base, a lever fulcrumed adjacent one end on said base, a wheel mounted for rotation on said lever adapted to contact the tight run of the drive chain for said drill string, a hydraulic cylinder element, a piston element operable in said cylinder element, means connecting one of said elements to said lever at a point between said wheel and said fulcrum, means connecting the other of said elements to said base, means affording the connection of said elements with said indicator to form a hydraulic system for operating said indicator responsive to relative movement of said elements, said lever having a slot between the ends thereof, and opposed flanges on said lever between which said wheel is mounted to extend through said slot.

7. In apparatus for operating an indicator for determining the torque of the chain driven drill string of well drilling apparatus, a base, a lever fulcrumed adjacent one end on said base, a wheel mounted for rotation on said lever adapted to contact the tight run of the drive chain for said drill string, a tread on said wheel, a hydraulic cylinder element, a piston element operable in said cylinder element, means connecting one of said elements to said lever at a point between said wheel and said fulcrum, means connecting the other of said elements to said base, means affording the connection of said elements with said indicator to form a hydraulic system for operating said indicator responsive to relative movement of said elements, said lever having a slot between the ends thereof, opposed flanges on said lever between which said wheel is mounted to extend through said slot, said lever having surfaces opposed to said chain and extending in opposite directions from said wheel above the axis of the wheel, and other surfaces on said lever extending laterally from opposite sides of the wheel above said axis, said surfaces being disposed to prevent the chain from contacting said wheel in the event of wearing away of said tread.

References Cited in the file of this patent

UNITED STATES PATENTS

| Number | Name | Date |
|---|---|---|
| 271,286 | Wellman | Jan. 30, 1883 |
| 1,692,057 | Smith et al. | Nov. 20, 1928 |
| 1,795,623 | Thompson et al. | Mar. 10, 1931 |
| 2,099,955 | Edwards | Nov. 23, 1937 |
| 2,488,070 | Spalding | Nov. 15, 1949 |

FOREIGN PATENTS

| Number | Country | Date |
|---|---|---|
| 138,540 | Great Britain | Feb. 12, 1920 |